US009586313B2

(12) United States Patent
Robinson et al.

(10) Patent No.: US 9,586,313 B2
(45) Date of Patent: Mar. 7, 2017

(54) TABLE FOR WEEDING HEAT TRANSFERS

(71) Applicant: GroupeSTAHL, St. Clair Shores, MI (US)

(72) Inventors: Benjamin Robinson, Carmichaels, PA (US); Rich Antoszewski, Carmichaels, PA (US)

(73) Assignee: GROUPESTAHL, Sterling Heights, MI (US)

( * ) Notice: Subject to any disclaimer, the term of this patent is extended or adjusted under 35 U.S.C. 154(b) by 0 days.

(21) Appl. No.: 14/746,481

(22) Filed: Jun. 22, 2015

(65) Prior Publication Data

US 2015/0367501 A1    Dec. 24, 2015

Related U.S. Application Data

(60) Provisional application No. 62/015,023, filed on Jun. 20, 2014.

(51) Int. Cl.

| | |
|---|---|
| *B32B 38/10* | (2006.01) |
| *B25H 1/18* | (2006.01) |
| *B32B 37/00* | (2006.01) |
| *B32B 43/00* | (2006.01) |
| *A47B 19/10* | (2006.01) |

(Continued)

(52) U.S. Cl.
CPC .......... *B25H 1/18* (2013.01); *B32B 37/0046* (2013.01); *B32B 38/10* (2013.01); *A47B 9/08* (2013.01);
(Continued)

(58) Field of Classification Search
CPC . B32B 38/10; B32B 43/006; Y10T 156/1153; Y10T 156/1168; Y10T 156/1911; A47B 9/08; A47B 19/10
(Continued)

(56) References Cited

U.S. PATENT DOCUMENTS 2,688,818 A     9/1954  Joy
3,714,714 A  *  2/1973  Bullard, III ........... B43L 13/041
                                                          33/445
(Continued)

FOREIGN PATENT DOCUMENTS

KR     20-1993-0002915     5/1993

OTHER PUBLICATIONS

PCT International Search Report dated Sep. 24, 2015 for corresponding PCT Application No. PCT/US2015/037013, filed on Jun. 22, 2015.

(Continued)

*Primary Examiner* — Mark A Osele
*Assistant Examiner* — Nickolas Harm
(74) *Attorney, Agent, or Firm* — Harness, Dickey & Pierce PLC

(57) ABSTRACT

The present teachings provide for a weeding table including a table portion, a clamp device, and a heating mechanism. The table portion can include a table member and a work-surface. The clamp device can include a clamp and a cylinder. The clamp can include a base fixedly coupled to the table member and an arm coupled to the base. The arm can be movable relative to the base between a first position and a second position. The cylinder can be coupled to the arm to be translated thereby such that the cylinder is a greater distance from the work-surface when the arm is in the first position than when the arm is in the second position. The cylinder can be rotatable relative to the arm about a longitudinal axis of the cylinder. The heating mechanism can be coupled to the table member and can be configured to heat the work-surface.

20 Claims, 2 Drawing Sheets

(51) Int. Cl.
*A47B 9/08* (2006.01)
*B32B 38/00* (2006.01)
*B32B 41/00* (2006.01)

(52) U.S. Cl.
CPC ........... *A47B 19/10* (2013.01); *B32B 38/0036* (2013.01); *B32B 41/00* (2013.01); *B32B 43/006* (2013.01); *Y10T 156/1153* (2015.01); *Y10T 156/1168* (2015.01); *Y10T 156/1911* (2015.01)

(58) Field of Classification Search
USPC ........................... 156/711, 714, 752; 74/164
See application file for complete search history.

(56) References Cited

U.S. PATENT DOCUMENTS

| | | | |
|---|---|---|---|
| 3,919,778 A * | 11/1975 | Dundore | B43L 13/045 33/445 |
| 4,250,396 A | 2/1981 | Moeller | |
| 4,665,619 A | 5/1987 | Pearl | |
| 4,930,911 A | 6/1990 | Sampson et al. | |
| 4,957,261 A * | 9/1990 | Cirami | A47B 19/10 248/451 |
| 5,375,536 A * | 12/1994 | Peters | A47B 23/002 108/23 |
| 5,695,600 A | 12/1997 | Goin | |
| 6,358,358 B1 | 3/2002 | Bilisoly | |
| 8,372,233 B2 | 2/2013 | Kronzer | |
| 8,535,469 B2 | 9/2013 | Kronzer | |
| 8,663,416 B2 | 3/2014 | Dolsey et al. | |
| 2004/0197536 A1 | 10/2004 | Stahl | |
| 2006/0186106 A1 | 8/2006 | Neville et al. | |
| 2010/0092735 A1 | 4/2010 | Perlinski et al. | |

OTHER PUBLICATIONS

Stahls'—Facebook page dated Mar. 28, 2013 showing comments on All Things Heat Printing.

* cited by examiner

TABLE FOR WEEDING HEAT TRANSFERS

CROSS-REFERENCE TO RELATED APPLICATIONS

This application claims the benefit of U.S. Provisional Application 62/015,023, FILED ON Jun. 20, 2014, the entire disclosure of which is incorporated herein by reference.

FIELD

The present disclosure relates to tables for weeding heat transfers.

BACKGROUND

This section provides background information related to the present disclosure which is not necessarily prior art.

It is generally known to create CAD cut heat transfer lettering and designs by cutting such letters and designs from a sheet of dual layer material. The top layer of the sheet is comprised of the material used for the letters and designs themselves, and the bottom layer is a backing layer. Once the outline of the letters and designs are cut into the top layer, the letters and designs must be removed from the backing layer, and any cavities in the letters and designs (such as the middle hole in the letter "O" for example) must be plucked out. This process is referred to as weeding. Weeding is commonly performed manually with a hand-held weeding tool. Weeding can be a monotonous and time-consuming job.

SUMMARY

This section provides a general summary of the disclosure, and is not a comprehensive disclosure of its full scope or all of its features.

The present teachings provide for a weeding table including a table portion, a first clamp device, and a heating mechanism. The table portion can include a table member and a work-surface. The first clamp device can include a first clamp and a first cylinder. The first clamp can include a first base that can be fixedly coupled to the table member and a first arm that can be coupled to the first base. The first arm can be movable relative to the first base between a first position and a second position. The first cylinder can be coupled to the first arm to be translated by the first arm. The first cylinder can be a greater distance from the work-surface when the first arm is in the first position than when the first arm is in the second position. The first cylinder can be rotatable relative to the first arm about a longitudinal axis of the first cylinder. The heating mechanism can be coupled to the table member and can be configured to heat the work-surface.

The present teachings further provide for a weeding table including a table portion, a pair of clamp devices, and a heating mechanism. The table portion can include a table member and a work-surface. The pair of clamp devices can be disposed at opposite ends of the work-surface. Each clamp device can include a clamp and a cylinder. The clamp can include a base and an arm. The base can be fixedly coupled to the table member. The arm can be coupled to the base and can be movable relative to the base between a first position and a second position. The cylinder can be coupled to the arm to be translated by the arm. The cylinder can have a longitudinal axis that can be parallel to the work-surface and can be a greater distance from the work-surface when the arm is in the first position than when the arm is in the second position. The cylinder can be rotatable relative to the arm and the work-surface about the longitudinal axis. The heating mechanism can be coupled to the table member and can be configured to heat the work-surface.

The present teachings further provide for a weeding table including a base portion, a table portion, a support portion, a pair of clamp devices, and a heating mechanism. The table portion can include a table member and a work-surface. The table member can be pivotably coupled to the base portion to rotate between a first angle and a second angle relative to the base portion. The support portion can be pivotably coupled to one of the table member or the base portion and can be movable between a first stand position and a second stand position. When in the first stand position, the support portion can engage the other of the table member or the base portion to support the table member at the first angle relative to the base portion. When in the second stand position, the support portion can support the table member at the second angle relative to the base portion. The pair of clamp devices can be disposed at opposite ends of the work-surface. Each clamp device can include a clamp and a cylinder. The clamp can include a base and an arm. The base can be fixedly coupled to the table member. The arm can be coupled to the base and can be movable relative to the base between a first position and a second position. The cylinder can be coupled to the arm to be translated by the arm. The cylinder can have a longitudinal axis that can be parallel to the work-surface and can be a greater distance from the work surface when the arm is in the first position than when the arm is in the second position. The cylinder can be rotatable relative to the arm and the work-surface about the longitudinal axis. The heating mechanism can be coupled to the table member and can be configured to heat the work-surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
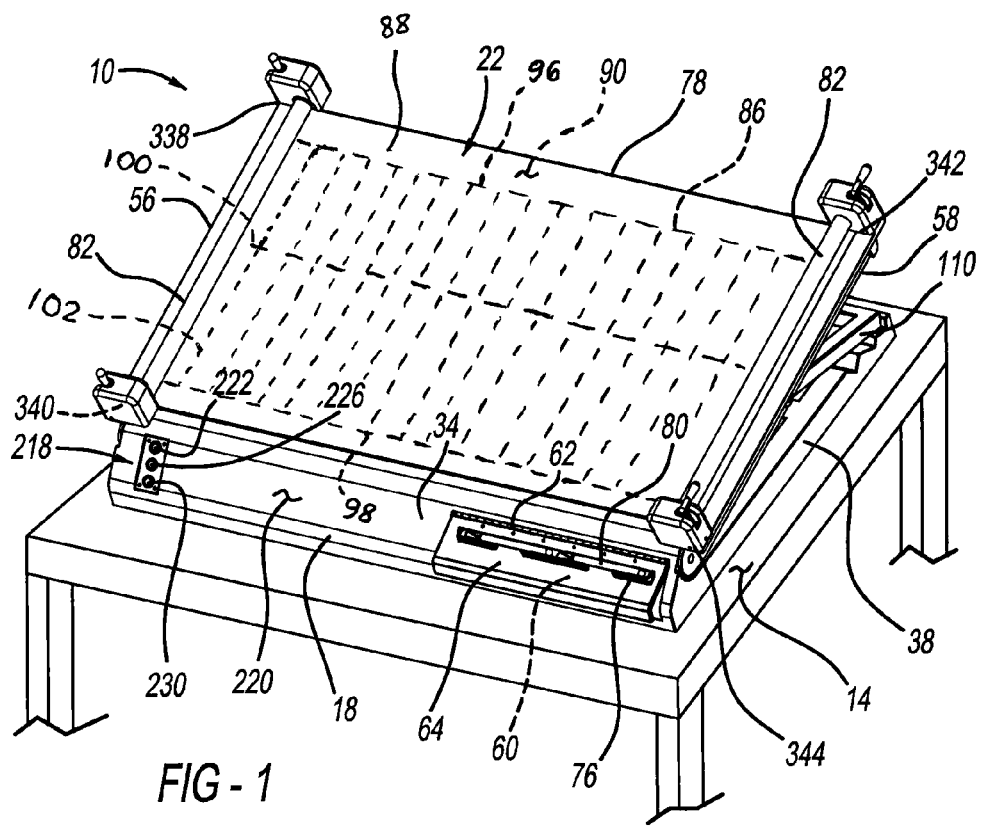
FIG. 1 is a perspective view of a weeding table in accordance with the present disclosure.
Figure 2:
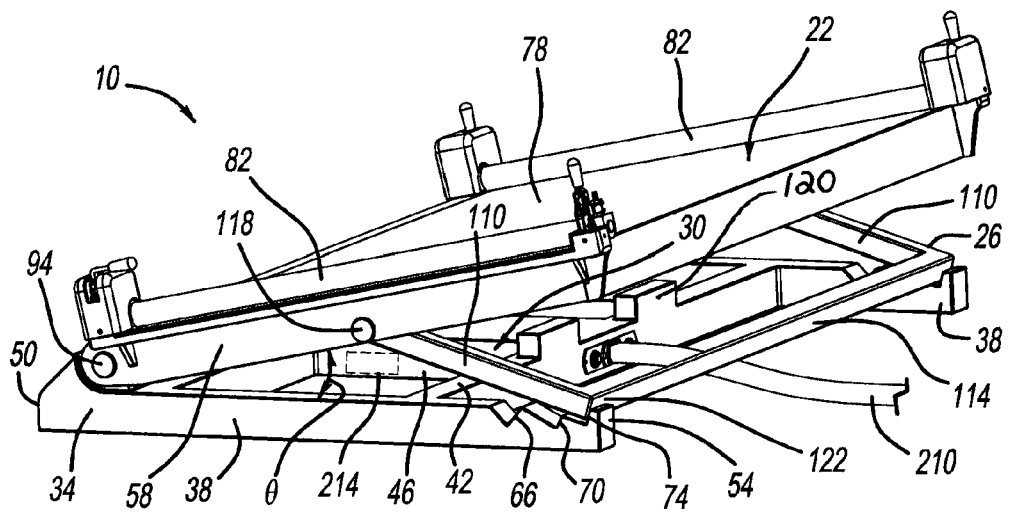
FIG. 2 is another perspective view of the weeding table of FIG. 1.

The present teachings are directed toward a weeding table that is customized to improve the efficiency of a person performing manual weeding on CAD cut heat transfer material. With reference to FIGS. 1 and 2, a weeding table 10 of a first construction is illustrated. The weeding table 10 can be portable and can be configured to be positioned upon a flat, stable surface (e.g. a work-bench 14). The weeding table 10 can include a base portion 18, a table portion 22, a latch arm or support portion 26, and a power unit 30.

The base portion 18 can include a front member 34, a pair of legs 38, a rear brace 42, and a housing 46. The front member 34 can have a generally wedge-shaped cross-section that narrows toward a front 50 of the weeding table 10 and expands toward a back 54 of the weeding table 10. The wedge-shape of the front member 34 can act as a support for the wrists or arms of a user of the weeding table 10. The front member 34 can extend longitudinally between a left side 56 and a right side 58 of the weeding table 10. The front member 34 can define a cavity 60. A hinge 62 can pivotably couple a door 64 to the front member 34 such that the door 64 is movable between an open position wherein the cavity 60 is accessible from the front 50 of the weeding table 10, and a closed position wherein the cavity 60 is covered by the door. The door 64 can also define a tool storage shelf 76 that can be configured to support a weeding tool 80 such as a Stahls' EZ WEEDER™ for example.

The front member 34 can be fixedly coupled to the legs 38 and can extend longitudinally between the legs 38 at the front 50 of the weeding table 10. The legs 38 can be generally perpendicular to the front member 34 and can be generally parallel to each other. The legs 38 can extend from the front member 34 toward the back 54 of the weeding table 10. Each leg 38 can define a plurality of notches and in the example provided, the legs 38 define a pair of first notches 66, a pair of second notches 70, and a pair of third notches 74. The first notches 66 can be proximate to the back 54 of the weeding table 10. The second notches 70 can be between the first notches 66 and the front member 34. The third notches 74 can be between the second notches 70 and the front member 34.

The rear brace 42 can be fixedly coupled to the legs 38. The rear brace 42 can be spaced apart from the front member 34 and can extend between the legs 38 proximate to the back 54 of the weeding table 10. In the example provided, the rear brace 42 is generally perpendicular to the legs 38 and is spaced apart from the back 54 of the weeding table 10.

The housing 46 can be fixedly coupled to the front member 34 and the rear brace 42. In the example provided, the housing 46 extends generally perpendicular to the front member 34 and the rear brace 42. The housing 46 can be hollow and can have an access cover or panel which can be removable to allow access to the inside of the hollow housing 46. For example, the access cover or panel can be on the bottom side of the housing 46 (i.e. the side that opposes the work bench 14 in FIG. 1).

The table portion 22 can include a table member 78, a pair of clamp devices 82, a heating element 86, and a scratch resistant covering 88. The table member 78 can define a flat work-surface 90. In the example provided, the work-surface 90 can be a rectangular shape that can be generally 20 inches high by 36 inches long, though other configurations can be used. The work surface 90 can be a thermally conductive material such as metal for example. The work surface 90 can be electrically grounded. The work surface 90 can also be covered or coated or can be formed of other materials. The scratch resistant covering 88 can be located on top of the work surface 90 and can be an electrically insulating material (i.e. not electrically conductive). In the example provided, the scratch resistant covering 88 is a material that is scratch resistant and can have one side that can stick to the work surface 90 (e.g. by an adhesive, electro-static attraction, or other suitable means). Thus, the scratch resistant covering 88 can be a removable and replaceable table surface or cover for the work surface 90.

The table member 78 can be pivotably coupled to the base portion 18. In the example provided, the table member 78 is pivotably coupled to the front member 34 by a pair of first pivot members 94 (only one of which is specifically shown) located proximate to the left and right sides 56, 58 of the weeding table 10. The table member 78 can pivot about the pivot members 94 such that the table member 78 and the legs 38 can define an angle θ therebetween. The angle θ can generally be between 0° wherein the table member 78 can rest atop the legs 38, and 90°.

The heating element 86 can be any suitable type of electric resistance heating element fixedly coupled to the table member 78. For example, the heating element 86 can be a generally electrically resistive wire that heats up when a voltage is generated across it (e.g. current flows through it). The heating element 86 can be disposed within (e.g. embedded or encapsulated) the table member 78. The heating element 86 can be located generally under the work surface 90. In the example provided, the heating element 86 can include a first bus bar 96, a second bus bar 98, a third bus bar 100, and a plurality of resistance heating elements 102.

The first, second and third bus bars 96, 98, 100 can run generally parallel across the table member 78, though other configurations can be used. The resistance heating elements 102 can extend between the bus bars 96, 98, 100 to electrically couple the bus bars 96, 98, 100. The resistance heating elements 102 can be configured to heat up when a voltage is generated across it. The bus bars 96, 98, 100 and the resistance heating elements 102 can be printed within a high temperature material such as a plastic for example. While three bus bars are shown in the example provided, it is understood that additional bus bars, an array of similar configured bus bars, or other configurations can be used.

When operated with 110V AC power, the first and second bus bars 96, 98 can be electrically coupled to neutral (e.g. the neutral wire of power cord 210) and the third bus bar 100 can be electrically coupled to power (e.g. the power wire of power cord 210). When operated with 220V AC power, either of the first or second bus bars 96, 98 can be electrically coupled to power and the other of the first or second bus bars 96, 98 can be electrically coupled to neutral. In another configuration, best shown by heating element 86' of FIG. 4 discussed below, the heating element 86 can wind through the table member 78 in a generally serpentine path, though other configurations can be used.

Figure 3:
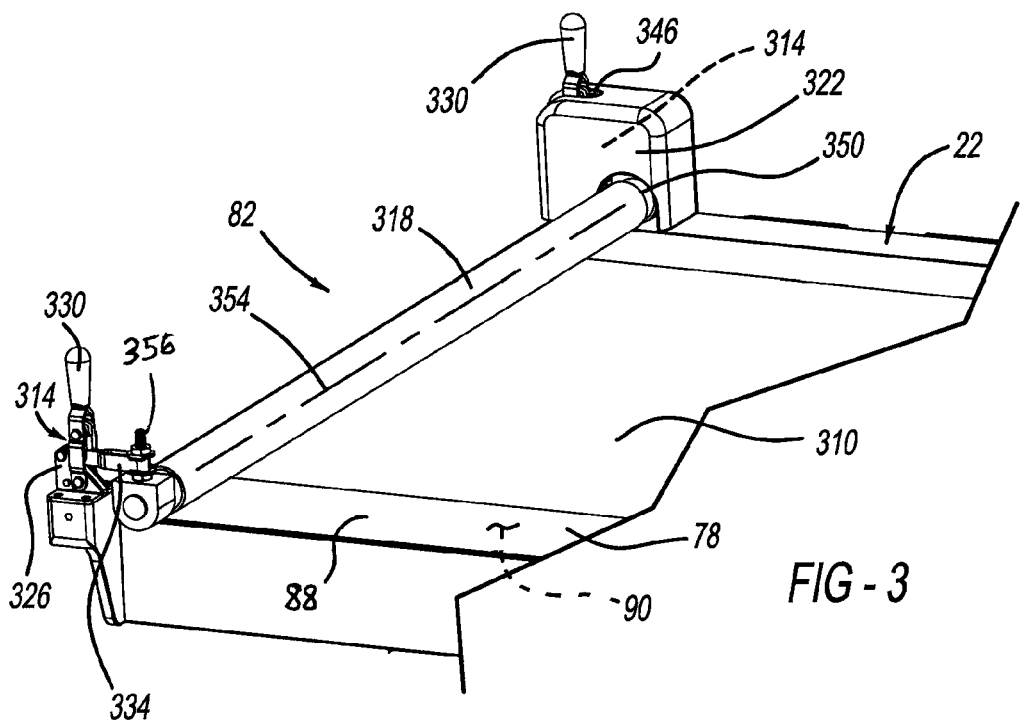
FIG. 3 is a perspective view of a portion of the weeding table of FIG. 1, illustrating a clamping mechanism.

With additional reference to FIG. 3, the clamp devices 82 can be configured to secure a work piece 310 to the table member 78. One of the clamp devices 82 can be located proximate to the left side 56 and the other clamp device 82 can be located proximate to the right side 58 of the weeding table 10. Each clamp device 82 can be fixedly coupled to the table member 78. Each clamp device 82 can include a pair of toggle clamps 314 and cylinder member 318. Each clamp device 82 can also include a pair of shrouds 322.

Each toggle clamp 314 can include a base 326, a lever 330, and an arm 334. The base 326 can be fixedly coupled to the table member 78 proximate to a respective corner of the table member 78 (e.g. corners 338, 340, 342, 344). The base 326, lever 330, and arm 334 can be coupled together as a toggle mechanism such that articulation of the lever 330 can rotate the arm 334 relative to the base 326 between a toggle or locked position (shown) and an unlocked position (not specifically shown). Each shroud 322 can be configured to cover one of the toggle clamps 314 to hide the base 326 and arm 334. Each shroud 322 can have a slot 346 through which the lever 330 can extend, and an aperture 350 through which the cylinder member 318 can extend.

The cylinder member 318 can extend between the two toggle clamps 314 and can be coupled to each respective arm 334 for common rotation therewith between the locked position and the unlocked position. In other words, the cylinder member 318 translates along an arcuate path when the arm 334 rotates between the locked and unlocked positions. Thus, the cylinder member 318 can extend substantially the entire length of the left and right sides 56, 58 of the table member 78. The cylinder member 318 can be rotatably coupled to each arm 334 such that the cylinder member 318 can rotate relative to the toggle clamps 314 about the cylinder member's 318 longitudinal axis 354. The cylinder member's 318 longitudinal axis 354 can be generally parallel to the work-surface 90. When the arm 334 is in the locked position, the arm 334 can be mechanically locked into a position where the arm 334 holds the cylinder member 318 such that the spacing between the cylinder member 318 and the work-surface 90 can be less than the thickness of the work piece 310. This spacing between the cylinder member 318 and the work-surface 90 can be adjustable by adjusting an adjustment screw 356. Thus, the work piece 310 can be sandwiched between the cylinder member 318 and the work-surface 90 (and the scratch resistant covering 88) to secure the work piece 310 to the table member 78 when the arm 334 is in the locked position.

When the arm 334 is moved from the locked position toward the unlocked position, the arm 334 can translate the cylinder member 318 away from the work-surface 90 such that the spacing between the work-surface 90 and the cylinder member 318 is greater than the thickness of the work piece 310. Thus, the work piece 310 can be free to be moved relative to the table member 78 when the arm 334 is in the unlocked position. The round shape of the cylinder member 318 and its ability to rotate relative to the arm 334 and the table member 78 about its longitudinal axis 354 can permit the cylinder member 318 to translate with the arm 334 between the unlocked and locked positions without disturbing the placement of the work piece 310 on the work-surface 90.

Returning to FIGS. 1 and 2, the latch arm or support portion 26 can include a pair of stand members 110 and a cross-brace 114. Each of the stand members 110 can be pivotably coupled to the table member 78 by a second pivot member 118. The second pivot members 118 can be spaced apart from the first pivot members 94 and can be generally between the first pivot members 94 and the back 54 of the weeding table 10. The cross-brace 114 can be fixedly coupled to the stand members 110 and can extend therebetween to couple the stand members 110 for common rotation about the second pivot members 118. An end 122 of the stand members 110 can be configured to be received in and abut against the notches 66, 70, 74 to position the table member 78 at fixed, predetermined angles θ. While three notches are illustrated, it is understood that additional notches or differently placed notches can be used to provide the table member 78 with different angles θ, if desired. Alternatively, the latch arm 26 can be supported by protrusions 120 that extend generally upward from the rear brace 42. It is understood that the legs 38, the rear brace 42, or the housing 46 can define notches or protrusions that can support the latch arm 26 at other desired angles θ in a similar manner.

In an alternative construction (not specifically shown) the stand members 110 can be pivotably coupled to the legs 38 and the notches 66, 70, 74 can be defined by the table member 78.

The power unit 30 can include a power cord 210, a power controller 214, and a control interface 218. The power controller 214 can be disposed or fully encased within the base portion 18. In the example provided, the power controller 214 is disposed within the hollow housing 46. The power cord 210 can electrically couple the power controller 214 to a power supply (e.g. a 120v AC or 220v AC electrical outlet). The power controller 214 can be electrically coupled to the control interface 218 and can be electrically coupled to the heating element 86, and can be configured for 120v AC or 220v AC operation.

The control interface 218 can be located on a front face 220 of the front member 34. The control interface 218 can be configured to allow a user of the weeding table 10 to adjust the temperature of the work-surface 90 (e.g. by adjusting the amount of power supplied to the heating element 86). In the example provided, the control interface 218 includes three buttons 222, 226, 230 that control the power supplied to the heating element 86, though other configurations can be used (e.g. switches, touch screens, additional or fewer buttons). The buttons 222, 226, 230 can be illuminated to indicate the status of the heating element 86, (e.g. power on, or selected heat setting).

Button 222 can be configured to correspond to a low heat setting, such that when button 222 is pressed, the power controller 214 can output a predetermined low amount of power to the heating element 86. As a non-limiting example, the low power setting can be configured to heat the work surface 90 to a temperature of approximately 110° F., though other temperatures can be used. Button 226 can be configured to correspond to a medium heat setting, such that when button 226 is pressed, the power controller 214 can output a predetermined medium amount of power to the heating element 86. As a non-limiting example, the medium power setting can be configured to heat the work surface 90 to a temperature of approximately 115° F., though other temperatures can be used. Button 230 can be configured to correspond to a high heat setting, such that when button 230 is pressed, the power controller 214 can output a predetermined high amount of power to the heating element 86. As a non-limiting example, the high power setting can be configured to heat the work surface 90 to a temperature of approximately 125° F., though other temperatures can be used. The buttons 222, 226, 230 can also be configured to turn off power to the heating element 86. The power unit 30 can also include a thermostat shut-off, such as a bi-metal switch for example, that can shut off power to the heating element 86 if the temperature of the work surface 90 exceeds a predetermined shut-off temperature. If the work surface 90 exceeds the predetermined shut-off temperature, the thermostat shut-off is tripped and the work surface 90 must cool down below the predetermined shut-off temperature before power can be restored to the heating element 86.

In operation, the user can place the work piece 310 on the work-surface 90 while the temperature of the work-surface 90 is elevated. The heat from the work-surface 90 can warm the work piece 310 to improve the pliability of the material. It has been found that the process of weeding a CAD cut work piece (e.g. work piece 310) can be made easier when the work piece 310 is at an elevated temperature, and thus the weeding table 10 improves the convenience of the manual weeding process.

Figure 4:
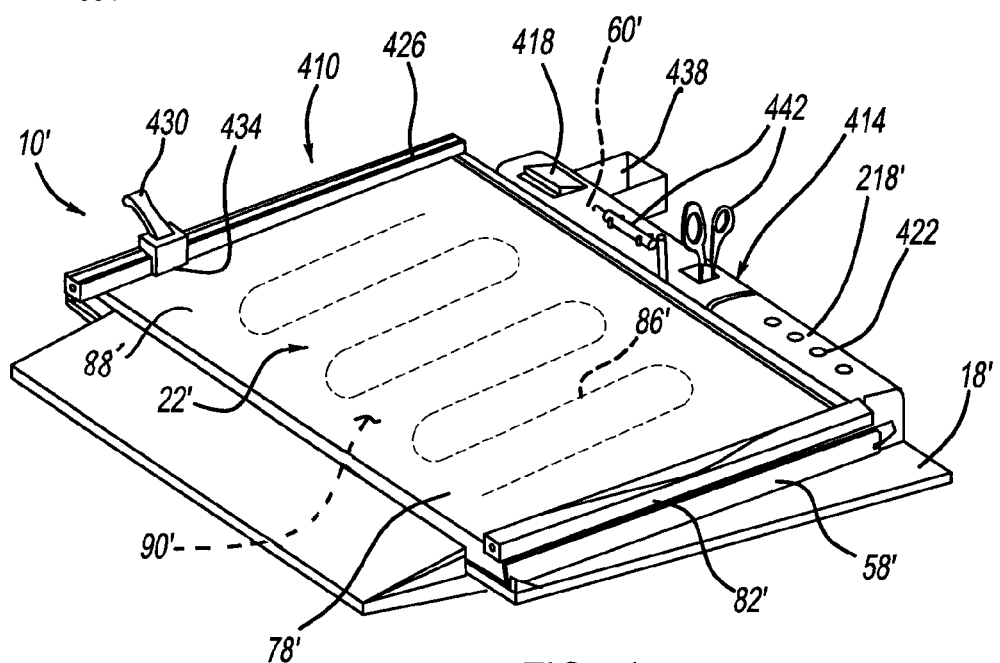
FIG. 4 is a perspective view of a weeding table of a second construction.

With reference to FIG. 4, a weeding table 10' of a second construction is illustrated. The weeding table 10' can be similar to the weeding table 10 (FIGS. 1-3) except as otherwise shown or described herein. Similar primed and non-primed reference numerals between FIGS. 1-3 and FIG. 4 refer to similar elements, the descriptions of which are incorporated herein by reference.

Similar to the weeding table 10, the weeding table 10' can be portable and tiltable. The weeding table 10' can include a base portion 18' and a table portion 22'. The table portion 22' can be tiltable relative to the base portion 18' around a pair of first hinges or pivot members 94' (only one of which is shown). The table portion 22' can include a clamp device 82' that can secure a work piece (e.g. work piece 310 of FIG. 3) to the table member 78'. The clamp device 82' can be constructed similarly to the clamp device 82 (FIGS. 1-3).

The weeding table 10' can also include a guided cross-cutter 410, a cavity 60', a tool storage mechanism 414, a tool cleaning station 418, and a set of lights 422. The guided cross-cutter 410 can include a track 426 and a cutting tool 430. The track 426 can extend across the table member 78' and can be coupled to the table member 78'. The cutting tool 430 can be slidably coupled to the track 426 such that the cutting tool 430 can slide across the table member 78'. The cutting tool 430 can include a blade 434 that extends toward the work surface 90' such that the blade 434 can cut a work piece (e.g. work piece 310 of FIG. 3) along a straight line as the cutting tool 430 slides along the track 426. The track 426 can also be slidably coupled to the table member 78' such that the track 426 can slide generally between the left and right sides 56', 58' of the weeding table 10'.

The cavity 60' can be defined by the base portion 18' and can be configured to receive a drawer 438 that can be slidably received in the cavity 60' and configured to store scraps or other items. The tool storage mechanism 414 can be configured to hold one or more weeding tools 442 such as scissors, tweezers, or a Stahls' EZ WEEDER™ for example. The tool cleaning station 418 can be a pad or surface configured to allow the user to wipe the weeding tools 442 clean after use. In the example provided, the tool cleaning station 418 includes a membrane with a slit in the top. The membrane is above the cavity 60' and the drawer 438. As the user weeds the work piece 310', parts of the work piece 310' can stick to the weeding tool. The user can insert the weeding tool through the slit in the tool cleaning station 418 and as the tool is removed, the pieces can be scraped off of the tool and into the drawer 438. The drawer 438 can then be removed from the cavity 60' to be emptied. The lights 422 can be configured to illuminate the work-surface 90 to improve visibility for the user. In the example provided, the lights are LED lights, though other configurations can be used. It is understood that the guided cross-cutter 410, cavity 60' with drawer 438, tool storage mechanism 414, tool cleaning station 418, and lights 422 can be used with the weeding table 10 (FIGS. 1-3).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A weeding table comprising:
   a table portion including a table member and a work-surface;
   a first clamp device including:
   a first clamp including a first base and a first arm, the first base being fixedly mounted to the table member, the first arm having a proximal end and a distal end, the proximal end of the first arm being rotatably coupled to the first base to permit the distal end of the first arm to move, relative to the first base, along an arcuate path between a first position and a second position; and
   a first cylinder coupled to the distal end of the first arm to be translated by the first arm, the first cylinder being a greater distance from the work-surface when the first arm is in the first position than when the first arm is in the second position, the first cylinder being rotatably coupled to the distal end of the first arm to permit the first cylinder to rotate, relative to the first arm, about a longitudinal axis of the first cylinder; and
   a heating device coupled to the table member and configured to heat the work-surface.

2. The weeding table of claim 1, wherein the first clamp device includes a pair of the first clamps, one of the first clamps being located proximate to a top of the work-surface, the other of the first clamps being located proximate to a bottom of the work-surface, wherein each end of the first cylinder is coupled to the first arm of one of the first clamps.

3. The weeding table of claim 1, further comprising:
   a second clamp device including:
   a second clamp including a second base and a second arm, the second base being fixedly mounted to the table member, the second arm having a proximal end and a distal end, the proximal end of the second arm being rotatably coupled to the second base to permit the distal end of the second arm to move, relative to the second base, along an arcuate path between a third position and a fourth position; and
   a second cylinder coupled to the distal end of the second arm to be translated by the second arm, the second cylinder being a greater distance from the work-surface when the second arm is in the third position than when the second arm is in the fourth position, the second cylinder being rotatably coupled to the distal end of the second arm to permit the second cylinder to rotate, relative to the second arm, about a longitudinal axis of the second cylinder.

4. The weeding table of claim 1, wherein the heating device includes a resistance heating element disposed within the table portion.

5. The weeding table of claim 4, wherein the heating device includes a controller configured to adjust a temperature output of the resistance heating element.

6. The weeding table of claim 1, further comprising a base portion, wherein the table member is pivotably coupled to the base portion to rotate between a first angle and a second angle relative to the base portion.

7. The weeding table of claim 6, further comprising a support portion pivotably coupled to one of the table member or the base portion and movable between a first stand position and a second stand position, wherein when in the first stand position, the support portion engages the other of the table member or the base portion to support the table member at the first angle relative to the base portion, and wherein when in the second stand position, the support portion supports the table member at the second angle relative to the base portion.

8. The weeding table of claim 1, further comprising a storage cavity.

9. The weeding table of claim 1, wherein the work-surface is removably coupled to the table member.

10. A weeding table comprising:
    a table portion including a table member and a work-surface;
    a pair of clamp devices disposed at opposite ends of the work-surface, each clamp device including:
    a clamp including a base and an arm, the base being fixedly mounted to the table member, the arm having a proximal end and a distal end, the proximal end of the arm being coupled to the base to permit the distal end of the arm to rotate, relative to the base, between a first position and a second position; and
    a cylinder coupled to the distal end of the arm to be translated by the arm along an arcuate path, the cylinder having a longitudinal axis that is parallel to the work-surface and is a greater distance from the work surface when the arm is in the first position than when the arm is in the second position, the cylinder being rotatably coupled to the distal end of the arm to permit the cylinder to rotate, relative to the arm and the work-surface, about the longitudinal axis; and
    a heating device coupled to the table member and configured to heat the work-surface.

11. The weeding table of claim 10, wherein each clamp device includes a pair of the clamps, the cylinder extending between the pair of clamps.

12. The weeding table of claim 10, wherein the heating device includes a resistance heating element disposed within table portion.

13. The weeding table of claim 12, wherein the heating device includes a controller configured to adjust a temperature output of the resistance heating element.

14. The weeding table of claim 10, further comprising a base portion, wherein the table member is pivotably coupled to the base portion to rotate between a first angle and a second angle relative to the base portion.

15. The weeding table of claim 14, further comprising a support portion pivotably coupled to one of the table member or the base portion and movable between a first stand position and a second stand position, wherein when in the first stand position, the support portion engages the other of the table member or the base portion to support the table member at the first angle relative to the base portion, and wherein when in the second stand position, the support portion supports the table member at the second angle relative to the base portion.

16. The weeding table of claim 10, further comprising a storage cavity.

17. The weeding table of claim 10, wherein the work-surface is removably coupled to the table member.

18. A weeding table comprising:
    a base portion;
    a table portion including a table member and a work-surface, the table member being pivotably coupled to the base portion to rotate between a first angle and a second angle relative to the base portion;

a support portion pivotably coupled to one of the table member or the base portion and movable between a first stand position and a second stand position, wherein when in the first stand position, the support portion engages the other of the table member or the base portion to support the table member at the first angle relative to the base portion, and wherein when in the second stand position, the support portion supports the table member at the second angle relative to the base portion;

a pair of clamp devices disposed at opposite ends of the work-surface, each clamp device including:
  a clamp including a base and an arm, the base being fixedly mounted to the table member, the arm having a proximal end and a distal end, the proximal end of the arm being rotatably coupled to the base to permit the distal end of the first arm to move, relative to the base, along an arcuate path between a first position and a second position; and
  a cylinder coupled to the distal end of the arm to be translated by the arm along the arcuate path, the cylinder having a longitudinal axis that is parallel to the work-surface and is a greater distance from the work surface when the arm is in the first position than when the arm is in the second position, the cylinder being rotatably coupled to the distal end of the arm to permit the cylinder to rotate, relative to the arm and the work-surface, about the longitudinal axis; and a heating device coupled to the table member and configured to heat the work-surface.

19. The weeding table of claim 18, wherein the heating device includes a resistance heating element disposed within the table portion.

20. The weeding table of claim 18, wherein the heating device includes a controller configured to adjust a temperature output of the resistance heating element between three distinct temperature settings.

\* \* \* \* \*